F. C. BLANCHARD, E. B. CROCKER & P. S. KEEFER.
PRESSURE REDUCING VALVE.
APPLICATION FILED AUG. 2, 1915.
1,210,891.
Patented Jan. 2, 1917.
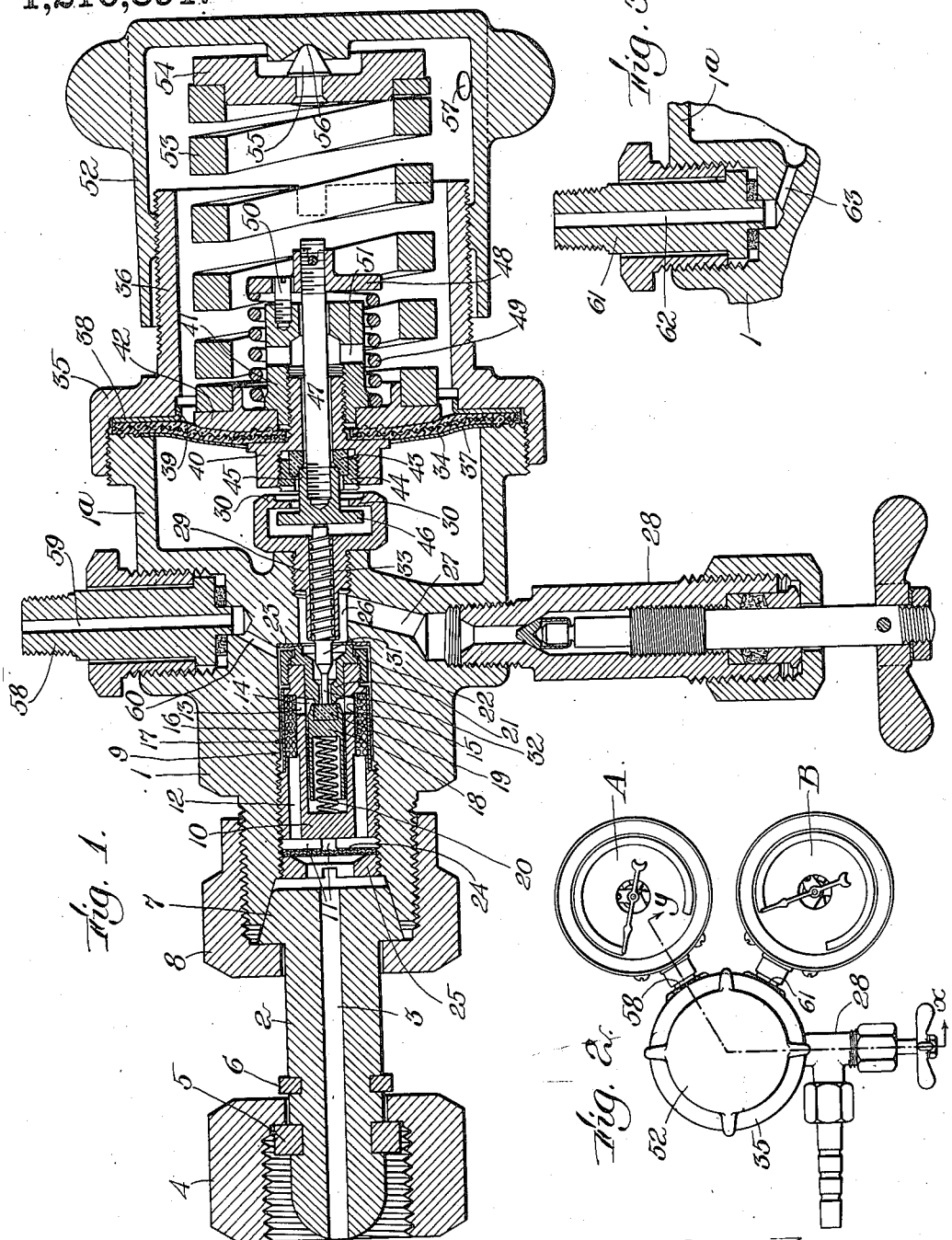
Inventors:
Frederick C. Blanchard,
Ernest B. Crocker,
Philip S. Keefer,
by Roberts, Roberts & Cushman
Attorneys.

UNITED STATES PATENT OFFICE.

FREDERICK C. BLANCHARD AND ERNEST B. CROCKER, OF BRIDGEPORT, AND PHILIP S. KEEFER, OF MILFORD, CONNECTICUT, ASSIGNORS TO THE ASHCROFT MANUFACTURING COMPANY, OF BRIDGEPORT, CONNECTICUT, A CORPORATION OF CONNECTICUT.

PRESSURE-REDUCING VALVE.

1,210,891.  Specification of Letters Patent.  Patented Jan. 2, 1917.

Application filed August 2, 1915. Serial No. 43,084.

*To all whom it may concern:*

Be it known that we, FREDERICK C. BLANCHARD and ERNEST B. CROCKER, citizens of the United States, and residents of Bridgeport, in the county of Fairfield and State of Connecticut, and PHILIP S. KEEFER, a citizen of the United States, and resident of Milford, in the county of New Haven and said State of Connecticut, have invented new and useful Improvements in Pressure-Reducing Valves, of which the following is a specification.

This invention relates to pressure reducing valves, or regulators; and while primarily designed for use in conjunction with high pressure oxygen gas reservoirs, it is applicable to other uses, and its principles of construction are susceptible of adaptation to valves for a variety of purposes, and for handling a wide range of initial pressures, and a great variety of gases, and conceivably of liquids.

For the purpose of illustration we will describe a pressure reducing valve designed for use upon an oxygen tank. It is to be understood, however, that this is by way of illustration merely and that the invention is not limited to such specific use or construction, but is capable of more general application, and its more general application is contemplated in the claims.

In the accompanying drawings which illustrate an embodiment of the invention in a regulator suitable for oxygen work,—
Figure 1 is a longitudinal section of the regulator on line $x$—$y$ of Fig. 2; Fig. 2 is an end elevation of the regulator viewed from the right of Fig. 1; and Fig. 3 is a fragmentary detail, in section, showing the connection between the delivery pressure gage and the valve body.

Referring to the drawings, 1 represents the valve body, which may be connected to the nozzle of a gas tank, or other source of fluid pressure, by a nipple or union 2, formed with an inlet bore or passage 3. The outer or free end of the nipple 2, is rounded or convex, as shown, to engage a similarly concaved end of the nozzle. A coupling nut 4 is provided on the nipple 2 to connect the valve to the nozzle of the gas tank, and is loosely held between two rings 5 and 6, which are secured in grooves in the nozzle 2 and hold the coupling nut 4 in position on the nozzle. The inner end of the nozzle is formed with a head 7, having a conical or tapering outer surface, which makes a tight joint with a correspondingly tapered inner surface at the inlet end of the valve body 1. The nipple 2 and valve body 1 are held together by a coupling nut 8.

The valve body 1 is made with a cylindrical bore or recess 9, screw-threaded part way inward from its inlet end. A plug or block 10 is secured within said recess 9, by means of a threaded enlargement which screws into the threaded end of the recess. Across the end of the block 10 are a pair of slots or channels 11, arranged transversely of each other, with which communicate passages 12 extending lengthwise through the block 10, and opening into an annular space formed between a reduced portion of the block 10 and the walls of the recess 9. This annular space is connected by passages 13 with the valve chamber 14, and holds a strainer or filter consisting of a sheet of wire gauze 15, or other suitable material, across passages 13, and a packing of absorbent, straining material such as woolen yarn 16 wound around the block within said annular space. Said winding of yarn is held in place by a sleeve 17. A valve member 18 works in the valve chamber 14, and its end which engages the valve-seat and constitutes the valve proper, is faced with some durable material 19 such as hard rubber, which will not be seriously affected by heat or by the gas for which the device is used. The valve 19 is the main valve and is urged toward its seat by a coil expansion spring 20. The valve-seat 21, made in a separate piece, is fitted into the end of the block 10, and is secured thereto by a coupling nut 22. The plug or block 10 and its associated parts which may thus be separately assembled in cartridge form, are screwed down into the bore 10 of the valve body, the inner end of the valve-seat fitting 21 being tightly sealed by the packing washer 23.

The passages leading to the main valve chamber are further screened by a wire gauze strainer or filter 24, which is clamped between the outer end of block 10 and a ring 25 threaded into the outer end of recess 9. The surface of the ring 25 adjacent to the strainer 24, is beveled so that the incoming gas may pass through a larger area of the strainer than it would do if the whole under surface of the ring lay directly upon the strainer.

On the delivery side of the main valve is the bore or passage 26, from which the delivery passage 27 leads outwardly through the side of the valve body 1 and is controlled by a hand-operated needle valve or delivery valve, indicated generally at 28, which may be of usual construction.

A tubular plug or bushing 29 is screwed into the outer end of bore 26, and is provided at its outer end with a yoke having inturned lips or flanges 30. A push rod 31 is mounted to move endwise in the bore through plug 29, the inner end being reduced in size as shown at 32, to extend through the valve-seat 21 into engagement with the valve 19. The part of the push rod 31 which is within plug 29 is made with a helical groove 33, forming with walls of the bore through plug 29 a helical choke passage for the purpose hereinafter explained.

The hub 1ᵃ of the valve body constitutes a delivery pressure chamber and a safety-valve chamber, one wall of which is formed by the diaphragm 34, preferably made of rubber, with a fabric reinforcement, and clamped to the end of hub 1ᵃ by the hub 35 of sleeve 36 screwed on to hub 1ᵃ. The diaphragm 34 is further reinforced on its inner side by an annulus 37 of thin flexible metal, and is protected against being cut or injured by the corner of shoulder 35, by an annulus 38, rounded over at its inner periphery as shown at 39. This is especially advantageous when parts 1ᵃ and 35 are being screwed together upon the diaphragm, since the hub 35 instead of turning on the rubber diaphragm will slip on the ring 38, which will be frictionally held against movement by the rubber diaphragm and will so protect the rubber from injury.

A diaphragm stud 40, extends through the center of the diaphragm and is fastened thereto by the stud nut 41, which also secures the disk 42 to the stud. The headed end of stud 40 is recessed or cupped to receive the safety-valve seat 43 which is held in place by the ring 44 screwed into the end of stud 40 at the outside of the valve-seat. 45 is the safety valve, normally closed upon seat 43, and provided with a head 46 to engage the lips 30 when the valve and its seat move to the right, carried by the flexible diaphragm, as hereinafter explained. The headed end of valve 45 engages the end of push rod 31, when the safety-valve and seat are moved in the opposite direction, and so lifts the main valve 19 off its seat. A valve stem 47 is secured to the safety-valve 45 and extends through the stud 40 and into the main regulating spring chamber within sleeve 36, and has secured to its end a safety-valve spring washer 48. The safety-valve spring 49 surrounding stud nut 41, and abutting at one end against said washer 48 and at the other end against disk 42, normally holds the safety-valve closed. The safety-valve is held against rotation by a locking pin 50, screwed into the end of stud nut 41 and projecting through a hole in washer 48. The nut 41 is made with one or more safety vents 51.

52 is a hand-operated regulating cap screwed on to sleeve 36, by turning which the operator may regulate the delivery pressure of the gas. A heavy coil spring 53 within the cap 52 and sleeve 36 bears at one end against the disk 42, thereby acting on the diaphragm, and at the other end against a disk 54, which is provided with a central pivot pin 55 engaging a socket 56 in the end of the cap 52, to permit the cap 52 to be turned easily without twisting the spring 53. The cap 52 is provided with a safety vent 57.

Two pressure gages A and B (Fig. 2) are mounted on the valve body, one of which, A, is connected to the pressure side of the reducing valve 19 to indicate the supply pressure or initial pressure, and the other of which, B, is connected to the delivery side of the reducing valve to indicate the delivery pressure. These gages may be of any usual or preferred type. The connecting fitting by which gage A is secured to the valve body is shown at 58. Its gas passage 59 connects with passage 60 in the valve body, which in turn communicates with the inlet passages at the high pressure side of the main valve seat 21. It will be understood that the sleeve 17 is not sealed tightly upon block 10, but fits sufficiently loose to permit the gas under pressure to reach passage 60. Similarly gage B is secured to the valve body by a connecting fitting 61 (Fig. 3), whose gas passage 62 connects with passage 63 communicating with the chamber in hub 1ᵃ, thus indicating the pressure at the delivery side of valve seat 21.

In operation the gas entering through passage 3, passes through the filter 24, which removes any coarser impurities, thence passes through ducts 11 and 12 and is again filtered by the absorbent material 16 and wire gauze screen 15, which keep out dust and other foreign matter, and thence passes to the reducing valve chamber 14. The extent of opening of the reducing valve 19 is determined by the pressure exerted by the main regulating spring 53, acting through push rod 31. The operator regulates the expansive force of the spring 53 by turning the regulating cap 52, thus pressing the diaphragm 34 inward with greater or less force as desired. This movement, acting through safety-valve seat 43, safety-valve 45, and push rod 31, lifts the reducing valve 19 from its seat and admits the gas to the discharge side of the reducing valve. The gas passes through ducts 26 and 27 to the discharge valve 28, and also through the helical passage 33 to the chamber 1ª. The pressure on the discharge side of the reducing valve will be automatically maintained by the action of the diaphragm and spring 53. When the pressure in chamber 1ª rises above the predetermined point for which the spring 53 is adjusted, and at which the gas pressure and spring pressure balance each other, the diaphragm will be forced outward against the spring by the excess of gas pressure, and the reducing valve 19 will be allowed to approach its seat, thus checking or wholly cutting off the flow of gas through the valve-seat 21. And when the pressure in chamber 1ª falls below the predetermined point, the spring 53, overbalancing the pressure in 1ª, will force the diaphragm inward thereby lifting the valve 19 farther from its seat (acting through push rod 31) and admitting more gas through the reducing valve. This action will continue automatically so long as the valve is in operation, and will maintain a constant delivery pressure, since the movements of the diaphragm, and consequently of the valve 19, are instantly responsive to the slightest changes in the relative pressures of the gas in chamber 1ª and of spring 53.

The predetermined delivery pressure may be varied as desired by adjusting the spring 53 by means of the regulating cap 52. The helical passage 33 formed in the push rod 31, operates to damp or check rapid and violent pressure fluctuations, which might otherwise cause the valve 19 to chatter or vibrate.

In order to prevent the occurrence of a dangerous degree of over-pressure on the discharge side of the device, the automatic safety-valve is provided, the operation of which is as follows: In case the valve 19 should fail to close by reason of the presence of dirt between the valve and its seat, or in case for any cause a substantial degree of over-pressure should occur in chamber 1ª, the diaphragm 34 will be forced outward, compressing spring 53, until the head 46 of the safety-valve engages the lips 30. Thereupon the safety-valve 45 is arrested and the continued outward movement of the diaphragm 34 carries the safety-valve seat 43 away from the valve, and permits the escape of the gas through stud 40 and thence through vents 51 in the stud nut 41 into the main spring chamber, which also is vented at 57. Thus no dangerous pressure can ever accumulate at the discharge side of the reducing valve, nor any pressure greatly in excess of that for which the main regulating spring 53 is set. The lips 30 perform the double function of opening the safety-valve, as described, and acting as a stop to engage the end of the diaphragm stud and prevent excessive inward movement of the diaphragm under the influence of spring 53, which might tend to break or strain the diaphragm.

An important feature of this pressure reducing valve is, that, in contrast to the former practice of closing the main valve against the high pressure, the high pressure in our regulator acts with the valve, tending to close it upon its seat, whereby the pressure works to keep the valve tight rather than to open it. This operates advantageously both as regards positively closing the regulator when the delivery of gas is stopped, and also to keep the delivery pressure up as the initial pressure decreases. Tests have proved that delivery pressures may be maintained by our regulator with a very slight excess pressure in the gas tank, and that consequently gas in a tank can be used up very economically. Moreover, with the regulator adjusted for a given delivery pressure, if the delivery of the gas is shut off beyond the regulator, without relieving the pressure adjustment, the main valve will not be damaged, since the tank pressure is simply holding the valve against its seat with a load equal to the tank pressure per square inch multiplied by the area of the seat, plus the small valve spring pressure. This total load is not sufficient to damage the valve disk, whereas in regulators where the valve works against the tank pressure, the valve will be thrown against its seat, under similar conditions of adjustment and operation, with a load equal to the pounds per square inch on the diaphragm multiplied by the area of the diaphragm. This load is far in excess of that in our valve and is so severe that it tends to force the valve upon its seat hard enough to form a plug on the face of the valve within the seat, thus spoiling the valve or causing the valve to stick and operate in a very uncertain manner.

It is to be noted also that the diaphragm 34 is reinforced on the inner side by a disk of spring metal 37 which bridges over the gap between the spring washer 42 and the diaphragm clamping members, so that the diaphragm has a metallic reinforcement on both sides, overlapping in such a way that there is no chance of the rubber being strained or distorted.

The main valve and valve seat, together with the filters, may be assembled in cartridge form, and removed or inserted as a unit, thus facilitating the repair or renewal of the main valve and its associated parts, and providing a structure in which the valve and seat are wholly sealed and protected against foreign matter.

Another unique feature is the safety-valve which operates certainly and positively when any predetermined over-pressure occurs, and so wholly removes the danger of bursting the diaphragm or otherwise injuring the regulator. This safety-valve acts whenever a reasonable amount of over-travel of the diaphragm takes place, caused by over-pressure as compared with the working delivery pressure. The closing as well as the opening of the valve is positive and is accomplished within a very close pressure range.

Having nearly the entire load on the diaphragm as an operative force to open the safety valve, the use of a spring of appreciable strength is permitted to close the safety-valve and hold it tight on its seat until it is again required to open. The pressure in the diaphragm chamber also tends to close the safety-valve. The advantages of this form of safety-valve over the ordinary pop safety valve generally used in regulators will be appreciated, since with pop safety valves the load under the seat must overbalance the spring pressure before the valve can lift, and when the valve is lifted the force which opens the valve is only the differential between the pressure load below the valve and the spring load above the valve. This renders the valve much less positive in action. The safety-valve is also concentric with the main valve of the regulator, and operates without levers or pivots, as does the main valve, so that friction, and necessity of adjustment, and difficulties of assembling are in a large measure eliminated.

The use of the needle valve for shutting off the delivery of gas to the torch makes it unnecessary to close the tank valve in case a hose should be blown off or an accident should happen to the torch.

The union connection by which the regulator is attached to the tank or other source of high pressure is not integral with the regulator body, but is a separate piece which may be screwed on to the body and may be readily adapted to fit various forms of tank delivery nozzles.

Without any change of spring and by simply manipulating the pressure adjustment, a delivery pressure varying from as high as 150 pounds down to a half pound can be secured. As the delivery pressure is automatically maintained notwithstanding the decrease of the supply pressure, until the supply pressure is approximately down to the delivery pressure, a longer running period without change of adjustments is possible than in regulators heretofore made, in which it has been necessary to change the adjustment quite frequently in order to maintain a reasonably constant delivery pressure.

We claim:—

1. In a reducing valve, a valve body having an initial pressure passage and a discharge pressure passage, a valve and valve seat therebetween, a discharge pressure chamber, the wall of which includes a diaphragm, a spring which imparts pressure to the diaphragm opposed to the pressure in said discharge pressure chamber, means actuated by the diaphragm for controlling the valve and a helical passage connecting said discharge passage and said discharge pressure chamber adapted to check rapid pressure fluctuations.

2. In a reducing valve, a valve body having an initial pressure passage and a discharge pressure passage, a valve and valve seat therebetween, a discharge pressure chamber, the walls of which include a diaphragm, a spring which imparts pressure to the diaphragm opposed to the pressure in said discharge pressure chamber, a bore connecting said discharge pressure passage and said discharge pressure chamber, and a valve controlling push rod actuated by said diaphragm extending through said bore and having a helical groove forming with said bore a tortuous passage adapted to check rapid pressure fluctuations.

3. In a reducing valve, a valve body having an initial pressure passage and a discharge pressure passage, a valve and valve seat therebetween, a discharge pressure chamber, the walls of which include a diaphragm, a spring which imparts pressure to the diaphragm opposed to the pressure in said discharge pressure chamber, a tubular bushing formed with a bore connecting said discharge pressure passage and said discharge pressure chamber, and a valve controlling push rod actuated by said diaphragm extending through said bore and having a helical groove forming with said bore a tortuous passage adapted to check rapid pressure fluctuations.

4. A reducing valve having an initial pressure passage, a discharge pressure passage, a main valve and valve seat therebetween, a diaphragm responsive to pressures on the discharge side of said main valve for controlling said main valve, a safety outlet passage communicating with said discharge passage having a safety valve seat, a safety valve controlling said safety outlet passage adapted to close in the direction of the pressure, and means operative by an excessive movement of said diaphragm caused by an over-pressure on the discharge side of said main valve adapted positively to open said safety valve against said pressure.

5. A reducing valve having an initial pressure passage, a discharge pressure passage, a main valve and valve seat therebetween, a diaphragm responsive to pressures on the discharge side of said main valve, for controlling said main valve, a safety valve and valve seat carried by and moving with said diaphragm, and means to arrest the safety valve when an excessive movement of the diaphragm occurs, caused by an over-pressure on the discharge side of said main valve, whereby the diaphragm will carry the seat away from the safety valve.

6. A reducing valve having an initial pressure passage, a discharge pressure passage, a main valve and valve seat therebetween, a diaphragm responsive to pressures on the discharge side of said main valve for controlling said main valve, a diaphragm stud carried by and extending through the middle of said diaphragm and having an outlet passage therethrough, a safety valve seat at the inner end of said diaphragm stud, a safety valve having a stem extending through said outlet passage, a spring coöperating with said stem to urge the safety valve toward its seat, and means to arrest the outward movement of the safety valve, when an excessive movement of the diaphragm occurs, caused by an over-pressure on the discharge side of said main valve, whereby the diaphragm will carry the seat away from the safety valve.

7. A reducing valve having an initial pressure passage, a discharge pressure passage, a main valve and valve seat therebetween, a diaphragm responsive to pressures on the discharge side of said main valve for controlling said main valve, a spring which imparts pressure to the diaphragm opposed to the pressure within the device, a safety valve and valve seat carried by and moving with said diaphragm, and a stop adapted both to arrest the outward movement of the safety valve when an excessive outward movement of the diaphragm occurs, and to limit the inward movement of the diaphragm under the influence of said spring.

8. In a reducing valve, a plug containing the main valve chamber, valve seat, valve, and gas passages which open through the sides of the plug and into the valve chamber, and a filter encircling said plug and overlying said gas passages the whole being assembled in a cartridge-like form, and being readily removable from and insertible into the valve body as a unit.

9. In a reducing valve, a plug containing the main valve chamber, valve seat, valve, and gas passages which open through the sides of the plug and into the valve chamber, and a filter encircling said plug and overlying said gas passages, and a sleeve inclosing said filter, the whole being assembled in a cartridge-like form, and being readily removable from and insertible into the valve body as a unit.

10. In a reducing valve, a valve body having a threaded bore, and a plug having a threaded portion by which the plug is removably screwed into said bore, and a reduced portion, said plug containing a main valve chamber, a valve seat, a valve, gas passages extending through said plug and opening into the space surrounding said reduced portion, and a filter fitted into said reduced portion and screening the passage to said valve chamber, the whole being assembled in a cartridge-like form and being readily removable from and insertible into said threaded bore as a unit.

11. In a reducing valve, a valve controlling diaphragm comprising a sheet of flexible, elastic material, and a metal reinforcement on each side of said sheet partly covering the sheet, each of said metal reinforcements lying opposite parts of said sheet not covered by the other reinforcement.

12. In a reducing valve, a valve controlling diaphragm comprising a sheet of flexible, elastic material, a flexible metal reinforcing annulus overlying the margin of said sheet on its inner side, and a disk reinforcing said sheet at its middle part on its outer side, the inner periphery of said annulus and the outer periphery of said disk overlapping each other.

13. In a reducing valve, a valve controlling diaphragm comprising a sheet of flexible, elastic material, a flexible metal reinforcing annulus overlying the margin of said sheet on its inner side, and a disk reinforcing said sheet at its middle part on its outer side, the inner periphery of said annulus and the outer periphery of said disk overlapping each other, and a diaphragm stud passing through both the disk and diaphragm and fastening the same together.

14. In a reducing valve, a valve body having an initial pressure passage and a discharge pressure passage, a valve and valve seat therebetween, a discharge pressure chamber the walls of which include a diaphragm, a spring which imparts pressure to the diaphragm opposed to the pressure in said discharge pressure chamber, a channel of relatively great length and small cross section connecting said discharge pressure passage and said discharge pressure chamber, and means adapted to be actuated by the diaphragm for controlling the valve comprising an element extending into said channel and coöperating therewith to check rapid pressure fluctuations.

Signed by us at Bridgeport, Conn., this 29" day of July, 1915.

FREDERICK C. BLANCHARD.
ERNEST B. CROCKER.
PHILIP S. KEEFER.